3,290,223
COATED NUCLEAR REACTOR FUEL PARTICLE OF UO₂ AND METHOD OF MAKING THE SAME
John M. Blocher, Jr., Melvin F. Browning, and Russell W. Dayton, Columbus, Ohio, assignors to the United States of America as represented by the United States Atomic Energy Commission
Filed Nov. 12, 1963, Ser. No. 323,183
5 Claims. (Cl. 176—67)

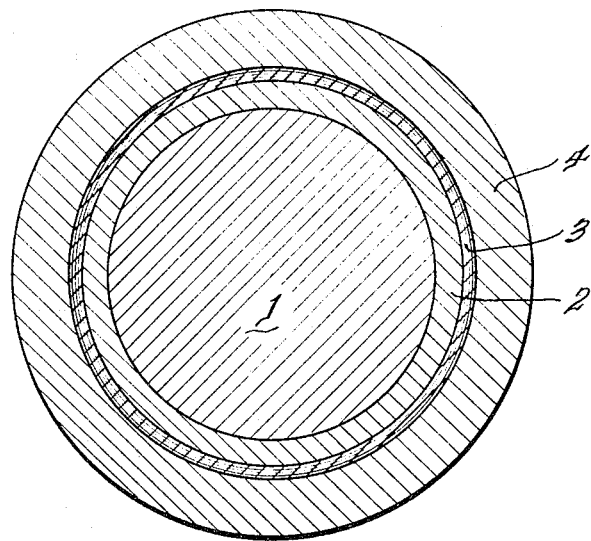

The invention relates to novel ceramic coated nuclear reactor particles, more particularly to ceramic coated ceramic fuel particles with improved resistance to damage by neutron irradiation at low temperatures, and to a method of making the same.

Ceramic coated reactor particles, of fissile or fertile ceramic materials, have been the subject of much investigation due to the geometrical advantage inherent in their small size for containment of fission product gases. In general, the results of such investigations have been promising but as yet no coated particles have been developed which will contain fission product gases reliably under all reactor conditions; in particular, ceramic coated particles have been found especially apt to crack under neutron radiation during startup or restartup of reactor operation while the reactor temperature is comparatively low, from room temperature to around 500° C.

Many attempts have been made to correct the deficiency just mentioned, such as by thickening the coatings of the particles, or embedding them in a matrix of ceramic material; these expedients have the disadvantages of increasing the nonfissionable or nonfertile material within the reactor, and of impeding heat transfer. The latter disadvantage is especially serious in the gas cooled reactor, for which this type fuel is particularly adapted, provided this defect could be overcome.

A wide variety of coating materials has been investigated with the view of improving fission gas containment. In addition to metals, which have unfavorable properties in a good many situations, many ceramic coatings have been tried such as the refractory metallic oxides. Of these, alumina, beryllia and magnesia have been found to be promising, especially when deposited by hydrolyzing their corresponding chlorides in a fluidized bed of fuel particles. Fluidized bed deposition methods of this type are well known and have been described in the literature, for example, on pages 415 to 420 of the report TID–7654, available at the Office of Technical Services, United States Department of Commerce, Washington 25, D. C. Nuclear reactor particles made in accordance with these fluidized bed deposition methods are known in the nuclear art as fluidized-bed coated particles, and the coatings as fluidized-bed-deposited coatings; often the temperature at which the deposition has taken place is given to characterize the particles, or coatings, more particularly. These terms will hereafter be used in this application in the sense just explained.

Another coating material which has been used for reactor particles is pyrolytic carbon, abbreviated as PyC, which is usually deposited by pyrolyzing a hydrocarbon gas such as methane, acetylene, and the like in a fluidized bed of particles. PyC may be homogeneous, or without discernible structure, columnar, or radially grained, or of the laminar type, in which the grain runs concentrically, resembling onion skin. An explanation of these types, and of the fluidized bed methods of depositing them on fuel particles is to be found in the TID–7654 publication above referred to, on pages 32 and following.

It is, accordingly, the general object of the invention to provide a ceramic coated nuclear reactor particle with improved containment of fission product gases.

It is a more particular object to provide a ceramic coated ceramic nuclear fuel particle with improved resistance to neutron radiation damage at around 500° C.

Other objects will appear as the description proceeds.

The foregoing objects are attained by our discovery that a ceramic fuel particle coated with an inner layer of beryllia, an intermediate layer of pyrolytic carbon, and an outer layer of alumina, shows, after low temperature neutron radiation, an ability to contain fission product gases far in excess of what would be expected from the individual containment abilities of these three coating materials added together. While no theoretical explanation has been firmly established for this more than additive phenomenon, our results show empirically that BeO acts effectively as a sump for fission recoils without transmitting the effects to the outer coating layer, that a layer of PyC has the ability to stop cracking, and Al₂O₃ has superior ability to contain fission produce gases once the recoil energy has been absorbed by the inner beryllia layer. These statements will be demonstrated when our findings are discussed in detail later on.

Attention is now directed to the drawing, the only figure of which is a cross sectional view of the ceramic coated particle of the invention. The numeral 1 designates the reactor particle, or core, in this case of UO₂, but which might also be other ceramic fuel such as UC, UN, PuO₂, PuC, PuN and the like. It might also be a fertile particle such as one of U²³⁸O₂, ThO₂, the corresponding carbides, nitrides and the like. In the present case the diameter of the particle is about 127 microns.

Concentric with and closely surrounding the core 1 is an inner layer 2 of BeO. Similarly, an intermediate layer 3 of PyC closely surrounds the layer of BeO, and an outer layer 4 of dense Al₂O₃ closely surrounds the layer of PyC. In this case the thickness of the BeO layer is about 18 microns, of the PyC layer about 4 microns, and of the Al₂O₃ layer about 43 microns.

*Example*

Thirteen types of ceramic coated fuel particles, each with a UO₂ core 127 microns in diameter, were made up in lots with different coatings from lot to lot. Coatings in all lots were deposited in fluidized beds of particles along the general lines indicated in TID–7654 above mentioned; BeO was deposited by hydrolyzing BeCl₂ in the bed; Al₂O₃ by hydrolyzing AlCl₃, and PyC by pyrolyzing acetylene.

One of the lots, No. 759A, was made according to the present invention, with an inner coating of dense BeO 18 microns thick, an intermediate coating of laminar PyC 4 microns thick, and an outer coating of dense Al₂O₃ 43 microns thick. The other twelve types of particles were made as indicated in Table I below, the left-hand column giving their lot numbers, the next column the diameter of the core, the next column the temperature of the fluidized bed where deposition of the respective layers on the particles took place, and the next column the materials and radial thickness of the layers, it being understood that in the case of multiple coatings the layers, and the corresponding temperatures of their deposition, are listed in the order of their deposition, the layer at the top being immediately next to the core. All lots received no further treatment after being coated except Lot 715A–HT which was heat treated at 1250° C. in hydrogen for 48 hours.

The lots were then subjected to equal neutron irradiation in a reactor at about 100° C. for the same length of time. Following the irradiation all lots, except No. 717B, were heated to 1300° C. for two hours in a tube swept by helium gas which was then carried to a gamma-ray spectrometer where it was monitored for any entrained xenon-133 coming from the particles. Lot 717B was heated in the same manner at 1100° C. The results in terms of comparative xenon release are set forth in the last column of Table I below:

TABLE I

| Lot [1] | Fuel Particle Diameter, μ | Coating Temperature, ° C. | Coating Description [2] | Xenon-Release Ratio,[3] p.p.m. |
|---|---|---|---|---|
| 715A | 127 | 1,000 | 42μ of dense $Al_2O_3$ | 3.2 |
| 715A-HT | 127 | 1,000 | ----do---- | 0.17 |
| 717B | 127 | 1,000 | 43μ of dense $Al_2O_3$ | 0.8 |
| 721C | 127 | 1,000 | 8μ of dense $Al_2O_3$ | 0.98 |
|  |  | 700 | 18μ of porous $Al_2O_3$ |  |
|  |  | 1,000 | 28μ of dense $Al_2O_3$ |  |
| 725D | 127 | 1,225 | 56μ of dense $Al_2O_3$ | 0.33 |
| 732D | 127 | 1,025 | 43μ of dense $Al_2O_3$ | 0.11 |
| 736B | 127 | 1,400 | 14μ of laminar PyC | 0.11 |
|  |  | 1,025 | 29μ of dense $Al_2O_3$ |  |
| 759A | 127 | 1,400 | 18μ of dense BeO | 0.01 |
|  |  | 1,250 | 4μ of laminar PyC |  |
|  |  | 1,025 | 43μ of dense $Al_2O_3$ |  |
| 761D | 127 | 1,025 | 63μ of dense $Al_2O_3$ | 0.12 |
| 762C | 127 | 1,025 | 20μ of dense $Al_2O_3$ | 0.14 |
|  |  | 1,200 | 4μ of laminar PyC |  |
|  |  | 1,025 | 44μ of dense $Al_2O_3$ |  |
| 763B | 127 | 1,400 | 21μ of dense BeO | 0.67 |
|  |  | 1,025 | 43μ of dense $Al_2O_3$ |  |
| 764D | 127 | 1,025 | 67μ of dense $Al_2O_3$ | 0.12 |
| 845E | 127 | 1,400 | 60μ of dense BeO | 0.10 |

[1] HT designates that sample has undergone heat treatment of 48 hr. at 1,250° C. in hydrogen.
[2] Coatings are listed in order of preparation in the case of multiple coatings.
[3] Total $Xe^{133}$ in p.p.m. released at maximum temperature of 1,300° C. after neutron activation except for Lot 717B, which was heated to only 1,100° C.

While the cause of the release of larger quantities of xenon-133 cannot be limited to cracking of the ceramic shells of the particles, a low release of xenon-133 must be evidence for the lack of any substantial amount of such cracked shells.

The composite coatings containing carbon layers, 736B, 759A and 762C have a xenon release average substantially lower than that of the others, demonstrating their effectiveness in preventing shell cracking. According to these results the particles of Lot 759A, show up markedly better than the other composite particles.

It is understood that the invention is not to be limited to the details given herein but that it may be modified within the scope of the appended claims.

What is claimed is:
1. A fission-product-restraining nuclear reactor fuel particle consisting of a core of $UO_2$, a layer of BeO on the core, a layer of laminar pyrolytic carbon on the layer of BeO, and a layer of $Al_2O_3$ on the layer of pyrolytic carbon.

2. The fuel particle of claim 1 where the layer of BeO is about 18 microns thick, the layer of laminar pyrolytic carbon is about 4 microns thick, and the layer of $Al_2O_3$ is about 42 microns thick.

3. The fuel particle of claim 1 where the layer of BeO is about 18 microns thick, fluidized bed-deposited at about 1400° C., where the layer of laminar pyrolytic carbon is about 4 microns thick, fluidized bed-deposited at about 1250° C., and where the layer of $Al_2O_3$ is about 43 microns thick, fluidized bed-deposited at about 1025° C.

4. A method of making a fuel particle with improved resistance to damage by neutron radiation, comprising fluidizing a bed of $UO_2$ particles, hydrolyzing $BeCl_2$ vapor within the bed for a time sufficient to deposit a layer of BeO on said particles, pyrolyzing a hydrocarbon gas within the bed for a time sufficient to deposit a layer of laminar pyrolytic carbon on said BeO layer, and hydrolyzing $AlCl_3$ within the bed for a time sufficient to deposit a layer of $Al_2O_3$ on said layer of laminar pyrolytic carbon.

5. A method of making a fuel particle with improved resistance to damage by neutron radiation, comprising fluidizing a bed of $UO_2$ particles, about 127 microns in diameter, hydrolyzing $BeCl_2$ vapor within the bed at 1400° C. for a time sufficient to deposit a layer about 18 microns thick of BeO on said particles, pyrolyzing acetylene within the bed at about 1250° C. for a time sufficient to deposit a layer of laminar pyrolytic carbon about 4 microns thick on said BeO layer, and hydrolyzing $AlCl_3$ at about 1025° C. within the bed for a time sufficient to deposit a layer of $Al_2O_3$ about 43 microns thick on said layer of laminar pyrolytic carbon.

References Cited by the Examiner

UNITED STATES PATENTS

| | | | |
|---|---|---|---|
| 2,949,382 | 8/1960 | Dickerman et al. | 117—69 |
| 2,987,417 | 6/1961 | Cochran | 117—69 |
| 3,121,047 | 3/1961 | Stoughton et al. | 117—69 |
| 3,122,595 | 2/1964 | Oxley | 176—91 X |
| 3,151,037 | 9/1964 | Johnson et al. | 176—67 |
| 3,161,701 | 12/1964 | Johnson et al. | 264—.5 X |
| 3,247,008 | 4/1966 | Fincle | 176—91 X |

FOREIGN PATENTS 933,500   8/1963   Great Britain.

OTHER REFERENCES

TID 7654, November 1962, Ceramic Matrix Fuel Coated Particles, Proceedings of a Symposium held at Battelle Memorial Institute.

WILLIAM D. MARTIN, *Primary Examiner.*

L. DEWAYNE RUTLEDGE, *Examiner.*

M. SOFOCLEOUS, J. V. MAY, *Assistant Examiners.*